(12) United States Patent
Klauss et al.

(10) Patent No.: US 7,000,241 B2
(45) Date of Patent: Feb. 14, 2006

(54) METHOD AND APPARATUS FOR MINIMIZING CONDITIONAL ACCESS INFORMATION OVERHEAD WHILE ENSURING CONDITIONAL ACCESS INFORMATION RECEPTION IN MULTI-TUNER RECEIVERS

(75) Inventors: Peter M. Klauss, Torrance, CA (US); Raynold M. Kahn, Los Angeles, CA (US); Gregory J. Gagnon, Torrance, CA (US); David D. Ha, San Gabriel, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 440 days.

(21) Appl. No.: 10/302,416

(22) Filed: Nov. 21, 2002

(65) Prior Publication Data
US 2004/0102155 A1   May 27, 2004

(51) Int. Cl.
*H04H 1/00* (2006.01)
*H04Q 7/20* (2006.01)

(52) U.S. Cl. .................. 725/25; 455/3.02; 455/3.06; 348/474

(58) Field of Classification Search ............ 455/3.02, 455/3.03, 3.06, 13.1, 427; 725/25, 27, 31, 725/68, 67; 380/241, 242; 348/474, 723
See application file for complete search history.

(56) References Cited

U.S. PATENT DOCUMENTS

| 4,613,901 A | 9/1986 | Gilhousen et al. |
| 4,633,309 A | 12/1986 | Li et al. |
| 4,675,732 A | 6/1987 | Oleson |
| 4,866,769 A | 9/1989 | Karp |
| 4,866,787 A | 9/1989 | Olesen |
| 5,033,084 A | 7/1991 | Beecher |
| 5,132,992 A | 7/1992 | Yurt et al. |
| 5,168,353 A | 12/1992 | Walker et al. |
| 5,172,413 A | 12/1992 | Bradley et al. |
| 5,199,066 A | 3/1993 | Logan |
| 5,301,352 A | 4/1994 | Nakagawa et al. |
| 5,357,276 A | 10/1994 | Banker et al. |
| 5,371,551 A | 12/1994 | Logan et al. |
| 5,386,587 A | 1/1995 | Yuzawa |
| 5,396,293 A | 3/1995 | Shellard |

(Continued)

FOREIGN PATENT DOCUMENTS

EP    0936812 A1    8/1999

(Continued)

OTHER PUBLICATIONS

P. Venkat Rangan, et al., "Designing An On-Demand Multimedia Service", IEEE Communications Magazine, Jul. 1992, vol. 30, No. 7, title page and pp. 56-64.

(Continued)

*Primary Examiner*—Simon Nguyen
(74) *Attorney, Agent, or Firm*—Georgann S. Grunebach (57) ABSTRACT

A method and apparatus for receiving conditional access information (CAI) on one or more of a plurality of tuners receiving the CAI from a first tuner of the plurality of tuners is disclosed. The method comprises the steps of determining if the CAI is of a first type that is transmitted by all of a plurality of transponders or of a second type that is transmitted by fewer than all of the plurality of transponders; passing, to a conditional access module, only CAI from the first tuner and rejecting CAI from any other tuner if the CAI is of a type that is transmitted by all transponders; and passing, to the conditional access module, all CAI from any of the plurality of tuners if the CAI is of a type that is transmitted by fewer than all transponders.

23 Claims, 8 Drawing Sheets

U.S. PATENT DOCUMENTS

| | | | |
|---|---|---|---|
| 5,420,866 A * | 5/1995 | Wasilewski | 370/426 |
| 5,438,423 A | 8/1995 | Lynch et al. | |
| 5,440,336 A | 8/1995 | Buhro et al. | |
| 5,473,609 A * | 12/1995 | Chaney | 370/312 |
| 5,495,531 A | 2/1996 | Smiedt | |
| 5,557,541 A | 9/1996 | Schulhof et al. | |
| 5,565,805 A | 10/1996 | Nakagawa et al. | |
| 5,583,937 A | 12/1996 | Ullrich et al. | |
| 5,586,264 A | 12/1996 | Belknap et al. | |
| 5,592,551 A | 1/1997 | Lett et al. | |
| 5,592,651 A | 1/1997 | Rackman | |
| 5,594,491 A | 1/1997 | Hodge et al. | |
| 5,619,247 A | 4/1997 | Russo | |
| 5,640,453 A | 6/1997 | Schuchman et al. | |
| 5,642,418 A | 6/1997 | Farris et al. | |
| 5,663,896 A | 9/1997 | Aucsmith | |
| 5,675,390 A | 10/1997 | Schindler et al. | |
| 5,677,895 A | 10/1997 | Mankovitz | |
| 5,701,383 A | 12/1997 | Russo et al. | |
| 5,710,970 A | 1/1998 | Walters et al. | |
| 5,715,315 A | 2/1998 | Handelman | |
| 5,715,403 A | 2/1998 | Stefik | |
| 5,721,829 A | 2/1998 | Dunn et al. | |
| 5,724,646 A | 3/1998 | Ganek et al. | |
| 5,729,280 A | 3/1998 | Inoue et al. | |
| 5,748,732 A | 5/1998 | Le Berre et al. | |
| 5,761,302 A | 6/1998 | Park et al. | |
| 5,764,762 A | 6/1998 | Kazmierczak et al. | |
| 5,784,095 A | 7/1998 | Robbins et al. | |
| 5,790,663 A | 8/1998 | Lee et al. | |
| 5,793,971 A | 8/1998 | Fujita et al. | |
| 5,805,699 A | 9/1998 | Akiyama et al. | |
| 5,826,165 A | 10/1998 | Echeita et al. | |
| 5,831,664 A | 11/1998 | Wharton et al. | |
| 5,845,240 A | 12/1998 | Fielder | |
| 5,850,218 A | 12/1998 | LaJoie et al. | |
| 5,864,747 A | 1/1999 | Clark et al. | |
| 5,867,207 A | 2/1999 | Chaney et al. | |
| 5,899,582 A | 5/1999 | DuLac | |
| 5,912,969 A | 6/1999 | Sasamoto et al. | |
| 5,914,941 A | 6/1999 | Janky | |
| 5,926,205 A | 7/1999 | Krause et al. | |
| 5,930,215 A | 7/1999 | Fite et al. | |
| 5,933,500 A | 8/1999 | Blatter et al. | |
| 5,936,660 A | 8/1999 | Gurantz | |
| 5,937,067 A | 8/1999 | Thatcher et al. | |
| 5,953,418 A | 9/1999 | Bock et al. | |
| 5,966,186 A | 10/1999 | Shigihara et al. | |
| 5,973,756 A | 10/1999 | Erlin | |
| 5,978,649 A | 11/1999 | Kahn | |
| 5,999,628 A | 12/1999 | Chan | |
| 5,999,629 A | 12/1999 | Heer et al. | |
| 6,005,937 A | 12/1999 | Lee | |
| 6,011,511 A | 1/2000 | Chuong et al. | |
| 6,025,868 A | 2/2000 | Russo | |
| 6,055,314 A | 4/2000 | Spies et al. | |
| 6,055,566 A | 4/2000 | Kikinis | |
| 6,061,451 A | 5/2000 | Muratani et al. | |
| 6,061,452 A | 5/2000 | Suzuki | |
| 6,069,647 A | 5/2000 | Sullivan et al. | |
| 6,072,873 A | 6/2000 | Bewick | |
| 6,072,982 A | 6/2000 | Haddad | |
| 6,075,330 A | 6/2000 | Terk | |
| 6,091,883 A | 7/2000 | Artigalas et al. | |
| 6,097,441 A | 8/2000 | Allport | |
| 6,144,400 A | 11/2000 | Ebisawa | |
| 6,154,206 A * | 11/2000 | Ludtke | 713/168 |
| 6,157,719 A | 12/2000 | Wasilewski et al. | |
| 6,157,949 A | 12/2000 | Cheng et al. | |
| 6,169,879 B1 | 1/2001 | Perlman | |
| 6,198,875 B1 * | 3/2001 | Edenson et al. | 386/94 |
| 6,202,211 B1 | 3/2001 | Williams, Jr. | |
| 6,229,895 B1 | 5/2001 | Son et al. | |
| 6,240,401 B1 | 5/2001 | Oren et al. | |
| 6,263,504 B1 | 7/2001 | Ebisawa | |
| 6,266,481 B1 | 7/2001 | Lee et al. | |
| 6,286,142 B1 | 9/2001 | Ehreth | |
| 6,288,716 B1 | 9/2001 | Humpleman et al. | |
| 6,289,455 B1 | 9/2001 | Kocher et al. | |
| 6,317,883 B1 | 11/2001 | Marics | |
| 6,317,884 B1 | 11/2001 | Eames et al. | |
| 6,370,688 B1 | 4/2002 | Hejna, Jr. | |
| 6,398,245 B1 | 6/2002 | Gruse et al. | |
| 6,405,372 B1 | 6/2002 | Kim et al. | |
| 6,415,031 B1 | 7/2002 | Colligan et al. | |
| 6,437,836 B1 | 8/2002 | Huang et al. | |
| 6,456,985 B1 | 9/2002 | Ohtsuka | |
| 6,466,671 B1 | 10/2002 | Maillard et al. | |
| 6,466,921 B1 | 10/2002 | Cordery et al. | |
| 6,473,858 B1 | 10/2002 | Shimomura et al. | |
| 6,480,667 B1 | 11/2002 | O'Connor | |
| 6,487,663 B1 | 11/2002 | Jaisimha et al. | |
| 6,487,722 B1 | 11/2002 | Okura et al. | |
| 6,496,980 B1 | 12/2002 | Tillman et al. | |
| 6,502,139 B1 | 12/2002 | Birk et al. | |
| 6,516,465 B1 | 2/2003 | Paskins | |
| 6,519,772 B1 | 2/2003 | Bopardikar | |
| 6,530,085 B1 | 3/2003 | Perlman | |
| 6,542,870 B1 | 4/2003 | Matsumoto | |
| 6,550,011 B1 | 4/2003 | Sims, III | |
| 6,574,609 B1 | 6/2003 | Downs et al. | |
| 6,611,812 B1 | 8/2003 | Hurtado et al. | |
| 6,637,027 B1 | 10/2003 | Breslauer et al. | |
| 6,654,547 B1 | 11/2003 | Maeda et al. | |
| 6,655,580 B1 | 12/2003 | Ergo et al. | |
| 6,671,881 B1 * | 12/2003 | Tamer et al. | 725/31 |
| 6,741,834 B1 * | 5/2004 | Godwin | 455/3.01 |
| 6,745,245 B1 * | 6/2004 | Carpenter | 709/229 |
| 6,772,434 B1 * | 8/2004 | Godwin | 725/68 |
| 6,853,728 B1 * | 2/2005 | Kahn et al. | 380/239 |
| 2001/0001876 A1 | 5/2001 | Morgan et al. | |
| 2001/0023219 A1 | 9/2001 | Arnold et al. | |
| 2001/0046299 A1 | 11/2001 | Wasilewski et al. | |
| 2002/0001386 A1 | 1/2002 | Akiyama | |
| 2002/0010920 A1 * | 1/2002 | Bertram | 725/25 |
| 2002/0048367 A1 | 4/2002 | Maillard | |
| 2002/0056112 A1 | 5/2002 | Dureau | |
| 2002/0101991 A1 | 8/2002 | Bacon et al. | |
| 2002/0112243 A1 | 8/2002 | Hunter | |
| 2002/0116705 A1 * | 8/2002 | Perlman et al. | 725/31 |
| 2002/0170054 A1 | 11/2002 | Kudelski et al. | |
| 2002/0170072 A1 * | 11/2002 | Lundbald et al. | 725/131 |
| 2002/0196374 A1 | 12/2002 | Barry et al. | |
| 2002/0196939 A1 * | 12/2002 | Unger et al. | 380/216 |
| 2003/0002679 A1 * | 1/2003 | Akiyama et al. | 380/278 |
| 2003/0002680 A1 * | 1/2003 | Akiyama et al. | 380/278 |
| 2003/0040962 A1 | 2/2003 | Lewis | |
| 2003/0061477 A1 | 3/2003 | Kahn et al. | |
| 2003/0105718 A1 | 6/2003 | Hurtado et al. | |
| 2003/0110132 A1 | 6/2003 | Sako | |
| 2003/0145183 A1 | 7/2003 | Muehring | |
| 2003/0174844 A1 | 9/2003 | Candelore | |
| 2003/0196113 A1 * | 10/2003 | Brown et al. | 713/201 |
| 2003/0208771 A1 | 11/2003 | Hensgen et al. | |
| 2003/0228911 A1 | 12/2003 | Dernis | |

FOREIGN PATENT DOCUMENTS

| | | |
|---|---|---|
| EP | 0975165 | 1/2000 |
| EP | 0975165 A2 | 1/2000 |
| EP | 0989557 | 3/2000 |
| EP | 0989557 A1 | 3/2000 |
| EP | 1156676 A2 | 11/2001 |
| EP | 1304871 A2 | 4/2003 |

| | | |
|---|---|---|
| EP | 1369152 A2 | 12/2003 |
| GB | 2354392 | 3/2001 |
| JP | 06351923 A | 3/1988 |
| JP | 11136708 A | 5/1995 |
| WO | WO 92/11713 | 7/1992 |
| WO | WO 00/13412 | 3/2000 |
| WO | WO 00/14967 | 3/2000 |
| WO | WO 00/19294 | 4/2000 |
| WO | WO 01/37546 | 5/2001 |
| WO | WO 01/43444 A2 | 6/2001 |
| WO | WO 01/99422 | 12/2001 |
| WO | WO 02/15184 A1 | 2/2002 |
| WO | WO 02/065750 A2 | 8/2002 |

OTHER PUBLICATIONS

Wanjiun Liao, et al., "The Split and Merge Protocol for Inter-active Video-On-Demand", IEEE MultiMedia, Oct.-Dec. 1997, vol. 4, No. 4, Index and pp. 51-62.

Robert Johnston, et al., "A Digital Television Sequence Store", IEEE Transactions on Communications, May 1978, vol. COM-26, No. 5, Index and pp. 594-600.

Proposed SMPTE Standard for Television—Splice Points for MPEG-2 Transport Streams, SMPTE Journal, Oct. 1998, SMPTE 312M, pp. 916-925.

Michael Robin, et al., "Digital Television Fundamentals—Design and Installation of Video and Audio Systems", McGraw-Hill, Chapter 8, title page(s) and pp. 345-425.

Yongchen Li, et al., "Security Enhanced MPEG Player", IEEE, 1996, pp. 169-175.

Fink, Ready to take the dive? It's fast-forward as new DVD and Divx formats hit market (including graphic: Home video: the next generation plus: Some selections that show off the system), York.

Sin-Joo Lee, et al., "A Survey of Watermarking Techniques Applied to Multimedia", IEEE, 2001, pp. 272-277.

PocketTV Brings Video to Palm-size PC, Mar. 9, 2000, 2 pages.

1st Report of EBU/SMPTE Task Force for Harmonized Standards for the Exchange of Television Program Material as Bit Streams, May 6, 1997, Version 1.30, pp. 1-73.

B. Schneier, Applied Cryptography-Protocols, Algorithms, and Source Code in C, 2nd Edition, pp. 216-222, 357-362.

HP Jornada 430/430se Palm-size PC: User's Guide, Hewlett Packard, 1999, pp. 7-9.

PocketTV-MPEG movie player for PocketPC and WinCE, May 17, 2000, MPEG TV, LLC, retrieved from URL: http://web.archive.org/web/200006210123803/www.mpegtv.com/wince/pockettv/index.html.

Download PockeTV (beta) for WinCE, Nov. 3, 1999, MPEG TV, LLC, retrieved from URL: http://web.archive.org/web/19991127093158/www.mpegtv.com/wince/pockettv/index.htlml.

Anerousis, N., "SkyCast: The Satellite Digital Broadcast Relay Service", AT&T Labs Research, unpublished manuscript, 1999, pp. 1-4.

* cited by examiner

METHOD AND APPARATUS FOR MINIMIZING CONDITIONAL ACCESS INFORMATION OVERHEAD WHILE ENSURING CONDITIONAL ACCESS INFORMATION RECEPTION IN MULTI-TUNER RECEIVERS

CROSS-REFERENCE TO RELATED APPLICATIONS

This application is related to the following patent application, which is hereby incorporated by reference herein:

U.S. patent application Ser. No. 10/302,416, entitled "METHOD AND APPARATUS FOR ENSURING RECEPTION OF CONDITIONAL ACCESS INFORMATION IN MULTI-TUNER RECEIVERS," by Peter M. Klauss, Raynold M. Kahn, Gregory J. Gagnon. and David D. Ha, filed on same date herewith.

BACKGROUND OF THE INVENTION

1. Field of the Invention

The present invention relates to systems and methods for providing video program material to subscribers, and in particular to a method and system for minimizing conditional access information while ensuring reception of conditional access information in multi-tuner receivers.

2. Description of the Related Art

Media programs such as video and audio information can be distributed to households via a variety of methods including terrestrial transmitters, cable, the Internet, and satellites. Each of these media distribution systems implement a large number of channels, and are therefore capable of providing a large number of concurrently broadcast media programs to each household.

While existing systems provide a large number of channels, there is a trend towards even greater numbers of channels and greater bandwidth requirements on existing channels to accommodate, for example, HDTV. With regard to satellite-based media program distribution systems, the increased channels and bandwidth demands can be satisfied by the introduction of additional satellites and/or the use of additional transponders on the satellites.

In order to receive signals from each of the plurality of satellites, ground stations can include multiple antennae (each directed to a satellite of interest) coupled to a single tuner, multiple receiving elements (referred to as low noise block converters, or LNBs) using a single reflector, or multiple antennae and multiple tuners.

At the same time, it is important that the media programs transmitted by the satellites be protected from unauthorized reception and/or reproduction. This is accomplished by encrypting the media programs, and broadcasting data that (along with hardware disposed at the receiver station) is used to decrypt the media programs.

Conditional access information is sent to the subscriber's receivers to authorize presentation of the media programs. Control access information is also used to cancel service, renew service, and to transmit other information to the subscriber's receiver. This information is usually transmitted in data packets called control access packets (CAPs). The user's receiver routes the packets to a control access module (CAM). Using the control access information, the CAM allows the encrypted media programs to be decrypted, this activating/deactivating service. Generally, CAPs are transmitted to all subscribers on all channels.

Subscriber receivers include single tuner and multiple tuner models. In both single-tuner and multiple tuner models, the tuner receives the CAPs that are transmitted by the transponder to which the tuner is tuned. In single-tuner models, all CAPs received by the tuner are simply sent to the CAM. However, in multiple tuner models, sending all CAPs received from all tuners to the CAM results in wasteful data redundancy on the tuner-CAM transport path, since many of the CAPs coming from different tuners will be the same.

Tuner-CAM data redundancy can be reduced by only sending CAPs from one of the tuners to the conditional access module. However, this solution could result in the loss of some CAPs, specifically, those CAPs that are sent only on selected transponders. One solution would be to transmit all CAPs on all transponders. However, this would increase data redundancy in the broadcast channels. What is needed is a system and method for efficiently providing CAPs to single-tuner and multi-tuner receivers for use in decrypting media programs. The present invention satisfies that need.

SUMMARY OF THE INVENTION

In summary, the present invention describes a system and method for receiving conditional access information (CAI) on one or more of a plurality of tuners. The method comprises the steps of determining if the CAI is of a first type that is transmitted by all of a plurality of transponders or of a second type that is transmitted by fewer than all of the plurality of transponders; passing, to a conditional access module, only CAI from the first tuner and rejecting CAI from any other tuner if the CAI is of a type that is transmitted by all transponders; and passing, to the conditional access module, all CAI from any of the plurality of tuners if the CAI is of a type that is transmitted by fewer than all transponders. In another embodiment, the present invention is described by a receiver comprising a plurality of tuners for receiving the CAI, and a verifier communicatively coupled to the plurality of tuners. The verifier receives the CAI from a first tuner of the plurality of tuners and comprising a module and determining if the CAI is of a first type that is transmitted by all of a plurality of transponders or of a second type that is transmitted by fewer than all of the plurality of transponders. The verifier also passes, to a conditional access module, only CAI from the first tuner and rejects CAI from any other tuner if the CAI is of a type that is transmitted by all transponders. The verifier also passes, to the conditional access module, all CAI from any of the plurality of tuners if the CAI is of a type that is transmitted by fewer than all transponders.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Video Distribution System

Figure 1:
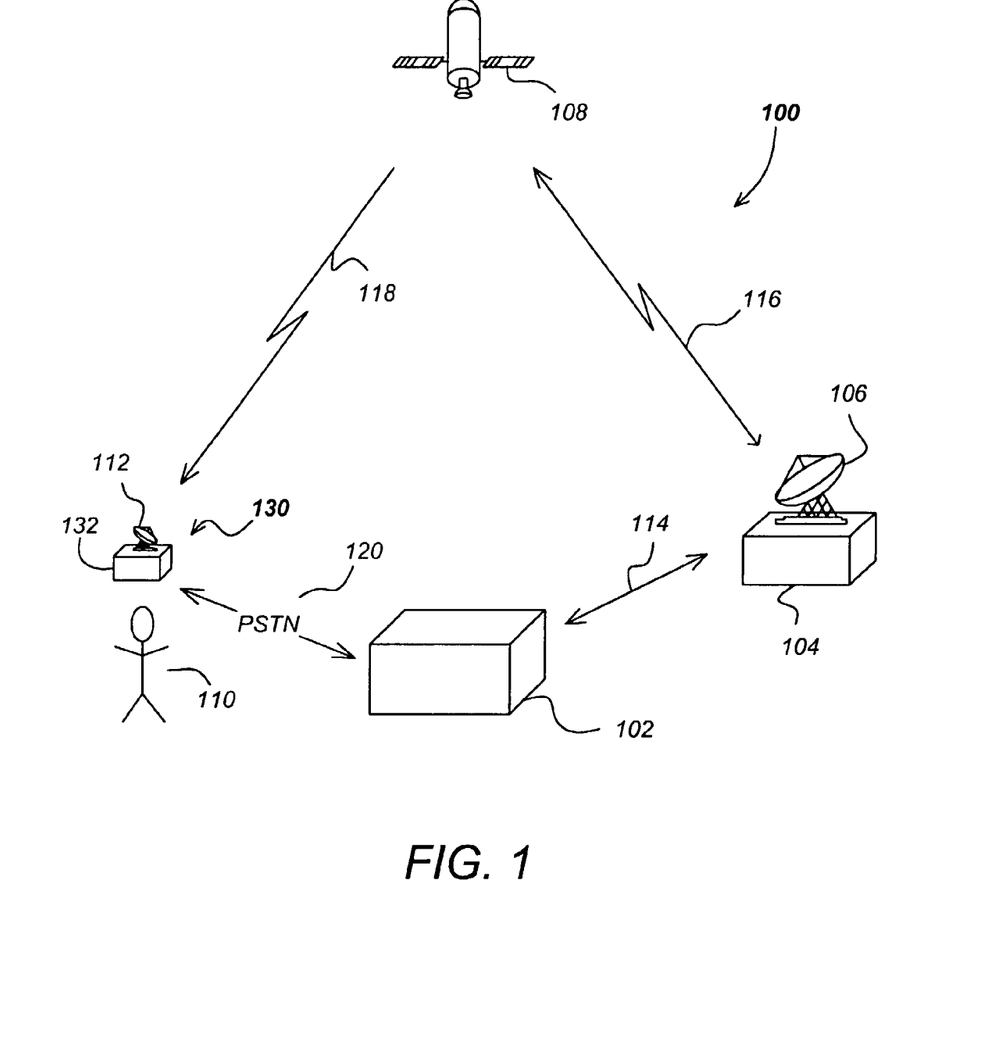
FIG. 1 is a diagram showing an overview of a video distribution system.

FIG. 1 is a diagram illustrating an overview of a video distribution system 100. The video distribution system 100 comprises a control center 102 in communication with an uplink center 104 via a ground link 114 and an integrated receiver/decoder (IRD) 132 at receiver station 130 via a public switched telephone network (PSTN) or other link 120. The control center 102 provides program material to the uplink center 104, coordinates with the receiver station 130 to offer subscribers 110 pay-per-view (PPV) program services, including billing and associated decryption of video programs.

The uplink center 104 receives program material and program control information from the control center 102, and using an uplink antenna 106, transmits the program material and program control information to the satellite 108. The satellite 108 receives and processes this information, and transmits the video programs and control information to the subscriber 110 at the receiver station 130 via downlink 118. Typically, each satellite includes a plurality of transponders that accept the information from the uplink center, and transmit the information to the IRD 132 in a bent-pipe fashion. The subscriber 110 receives this information using the subscriber antenna 112 communicatively coupled to the IRD 132.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However, using data compression and multiplexing techniques the channel capabilities are far greater. For example, two satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by traditional broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information or data as well.

Figure 2:
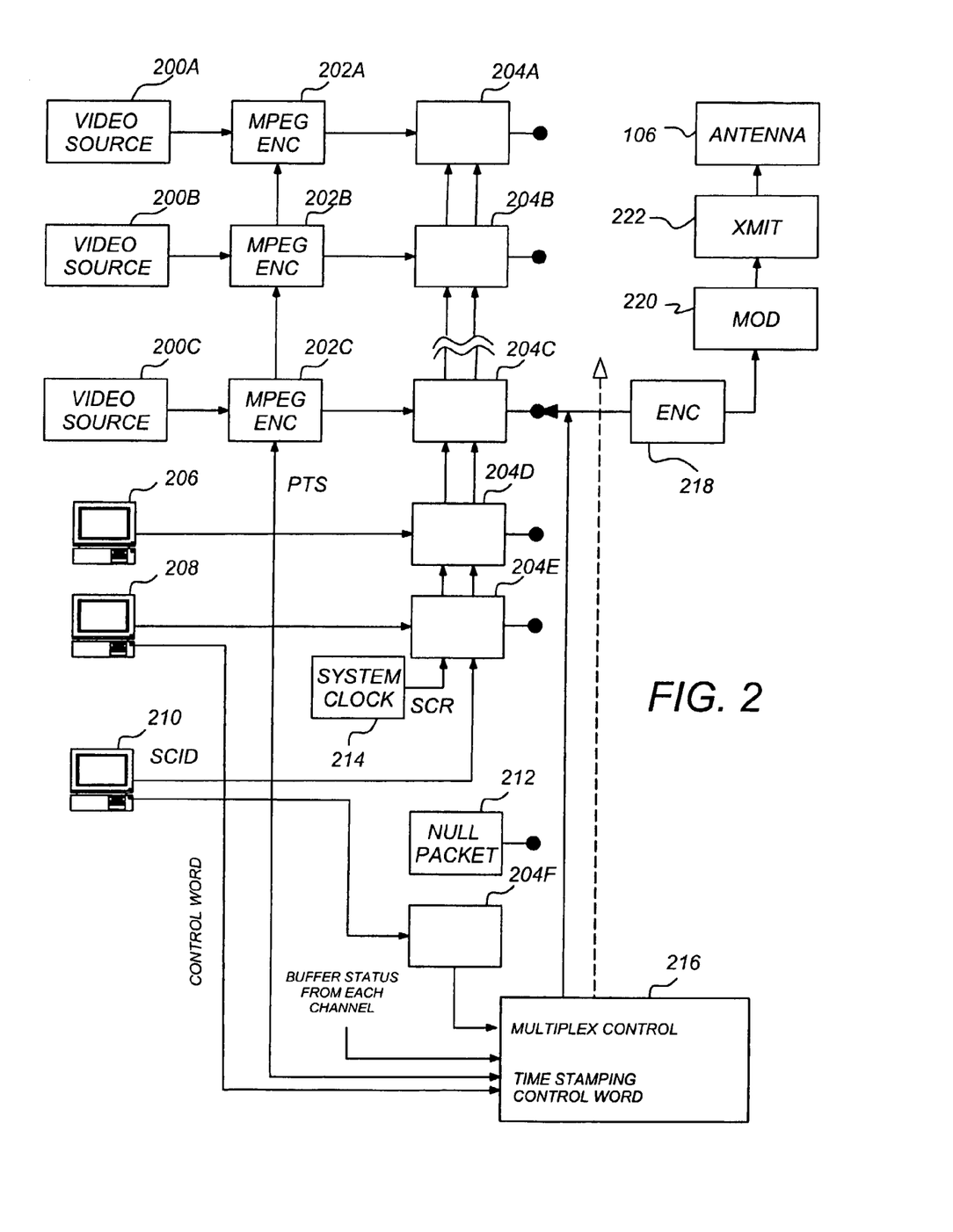
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a computer data source 206.

The video channels are provided by a program source of video material 200A–200C (collectively referred to hereinafter as video source(s) 200). The data from each video program source 200 is provided to an encoder 202A–202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A–204F (collectively referred to hereinafter as packetizer(s) 204) associated with each source 200.

The data packets are assembled using a reference from the system clock 214 (SCR), a control word (CW) generated by the conditional access manager 208, and a system channel identifier (SCID) that associates each of the data packets that are broadcast to the subscriber with a program channel. This information is transmitted to the packetizers 204 for use in generating the data packets. These data packets are then multiplexed into serial data, encoded, modulated, and transmitted.

In the illustrated embodiment, the conditional access manager 208 is a computer system comprising a processor communicatively coupled to a memory and an interface for communicating with the packetizers 204A–204E as well as other system elements. The conditional access manager 208 may also be implemented as a software module implemented in a computer performing other functions in the uplink facility 104 or control center 102, or dedicated hardware device.

A special packet known as a control word packet (CWP) (hereinafter also referred to as a conditional access packet or CAP) which comprises control access information (CAI) including the control word (CW) and other control data used in support of providing conditional access to the program material is also encrypted and transmitted.

Figure 3A:
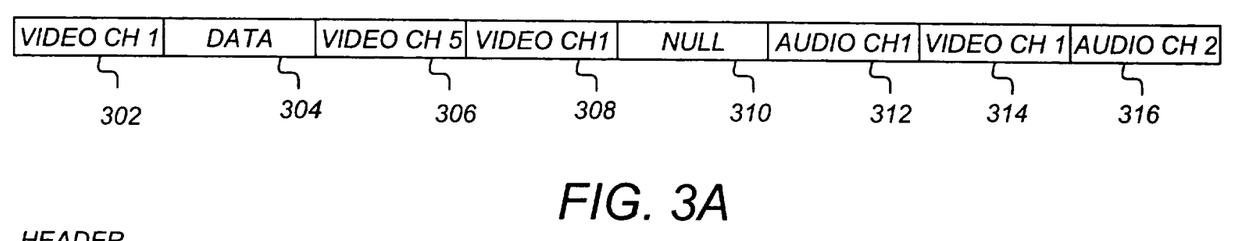
FIG. 3A is a diagram of a representative data stream received from a satellite.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 206. The next packet segment 306 comprises information from video channel 5 (from one of the video program sources 200), and the next packet segment includes information from video channel 1 (again, coming from the first video program source 200A). The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106.

Subscribers 110 receive media programs via a subscriber receiver or IRD 132. Using the SCID, the IRD 132 reassembles the packets to regenerate the program material for each of the channels. As shown in FIG. 3A, null packets created by the null packet module 312 may be inserted into the data stream as desired.

Figure 3B:
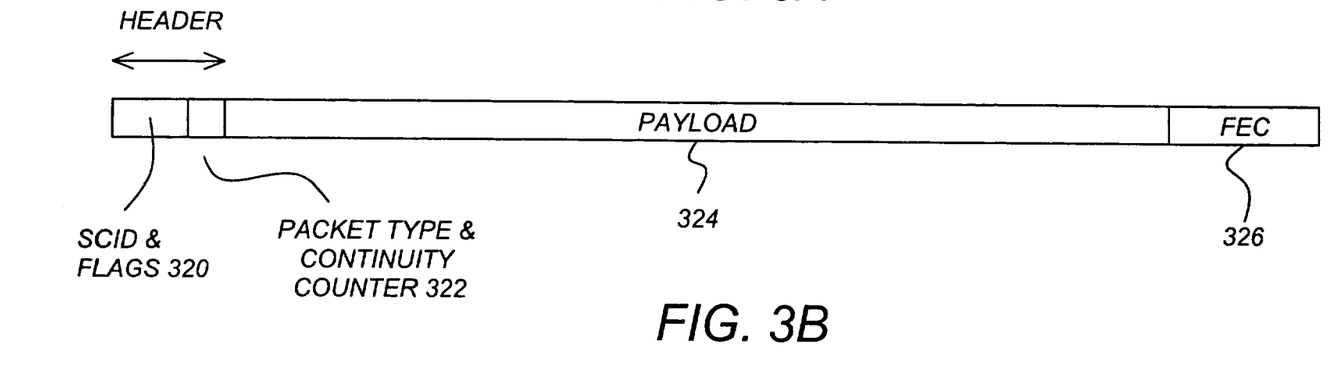
FIG. 3B is a diagram illustrating the structure of a data packet.

FIG. 3B is a diagram of a data packet. Each data packet (e.g. 302–316) is 147 bytes long, and comprises a number of packet segments. In the illustrated embodiment, the data packets (302–316) each comprises a header having a first packet segment 320 and a second packet segment 322.

The first packet segment 320 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet.

The second packet segment 322 is made up of a 4-bit packet type indicator and a 4-bit continuity counter. The packet type identifies the packet as one of the four data types (video, audio, data, or null). When combined with the SCID, the packet type determines how the data packet will be used.

Figure 3C:
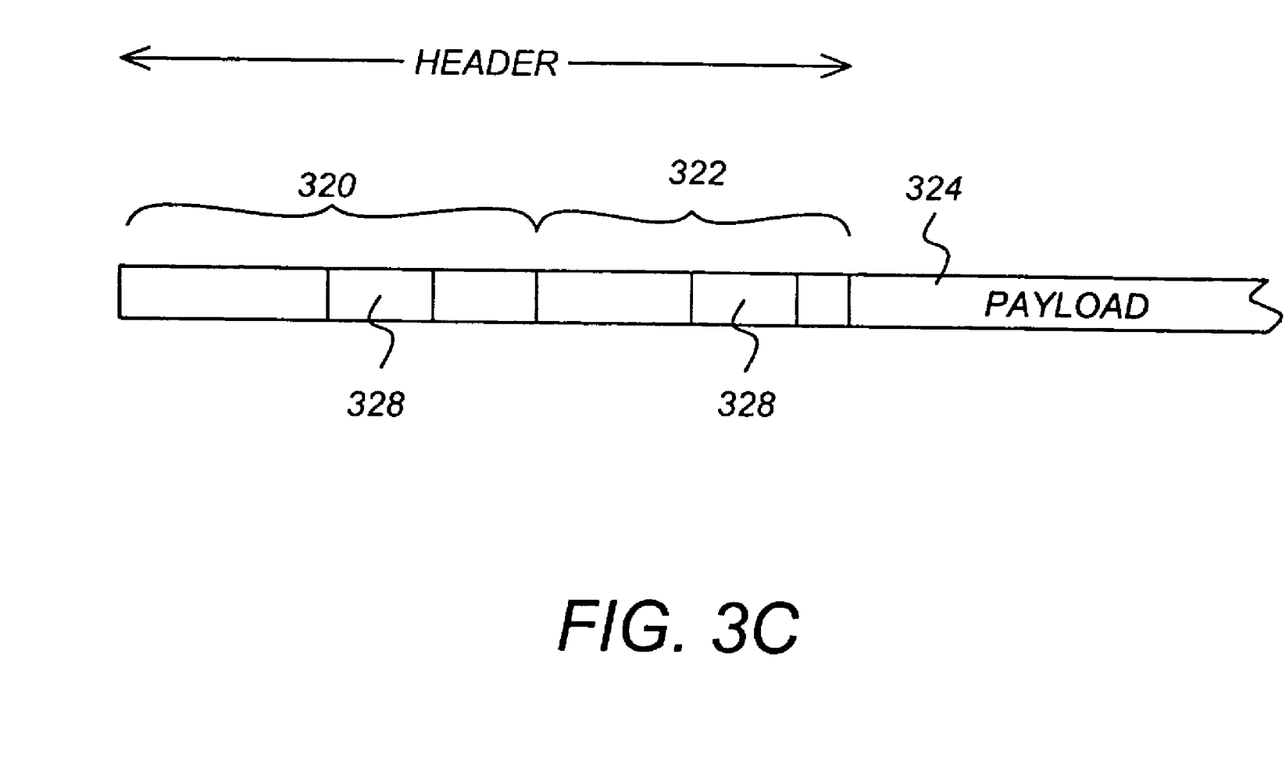
FIG. 3C is a diagram illustrating a portion of the data packet.

As shown in FIG. 3C, when the data packet is a CAP, first packet segment 320 or the second packet segment 322 can include data (328 or 330, respectively) indicating whether the CAP is a first type that is transmitted by all transponders (type A) or a data 328 or a type that is only transmitted by a subset of the transponders (type S). The first packet segment 320 or the second packet segment 322 can also be used include data (328 or 330, respectively) including a channel identifier that indicates which channel is transmitting the CAP, as is described in further detail below. In one embodiment, one or more signal bits can used to indicate that some of the bits in the first 320 or second packet segments 322 include CAI type and/or channel information. In another embodiment, data bits in the packet segment are dedicated to the transmission of the CAI type and/or channel information (although other information may be transmitted using these bits when no CAI type or channel information is included in the data packet). The CAI can also be transmitted by substituting bits in the data payload 324. If desired, this can be accomplished using techniques similar to those used in watermarking.

Although the header of the illustrated embodiment is 8 bits, the size of the header can be increased or decreased in order to provide sufficient room to identify more CAP data types or to accommodate additional channel identifiers. If desired, the header size can be different for CAPs (versus packets that have media program information) or can adaptively change based on data requirements.

The continuity counter increments once for each packet type and SCID. The next packet segment 324 comprises 127 bytes of payload data, which is a portion of the video program provided by the video program source 200. The final packet segment 326 is data required to perform forward error correction.

Encryption of Media Programs

Media programs are encrypted by the encryption module 218 before transmission to assure that they are received and viewed only by authorized subscribers. Each media program is encrypted according to an conditional access information (CAI). In one embodiment, the conditional access information includes an alphanumeric encryption key referred to hereinafter as a control word (CW). This encryption can be accomplished by a variety of data encryption techniques, including the data encryption standard (DES) and the Rivest-Shamir-Adleman (RSA) algorithm.

To decrypt the media programs, the subscriber's 110 IRD 132 must also have access to the CW. To maintain security, CWs are not transmitted to the IRD 132 plaintext. Instead, CWs are encrypted before transmission to the subscriber's IRD 132. The encrypted CW is transmitted to the subscriber's IRD 132 in a control word (data) packet.

In one embodiment, the data in the control word packet (CWP), including the CW, is encrypted and decrypted via what is referred to hereinafter as an input/output (I/O) indecipherable algorithm.

An I/O indecipherable algorithm is an algorithm that is applied to an input data stream to produce an output data stream. Although the input data stream uniquely determines the output data stream, the algorithm selected is such that its characteristics cannot be deciphered from a comparison of even a large number of input and output data streams. The security of this algorithm can be further increased by adding additional functional elements which are non-stationary (that is, they change as a function of time). When such an algorithm is provided with identical input streams, the output stream provided at a given point in time may be different than the output stream provided at another time.

So long as the encryption module 218 and the IRD 132 share the same I/O indecipherable algorithm, the IRD 132 can decode the information in the CWP to retrieve the CW. Then, using the CW, the IRD 132 can decrypt the media program so that it can be presented to the subscriber 110.

To further discourage piracy, the control data needed to decrypt and assemble data packets into viewable media programs may be time-varying (the validity of the control data in a CWP to decode a particular media program changes with time). This can be implemented in a variety of ways.

For example, since each CWP is associated with a SCID for each media program, the SCID related to each CWP could change over time.

Another way to implement time-varying control data is to associate time stamps with the received data stream and the CWP control data. In this case, successful decoding of the CWP to produce the CW would require the proper relationship between the time stamps for the data stream and the control data in the CWP. This relationship can be defined, for example, by changing the decryption scheme used to generate the CW from the CWP according to the received time stamp for the data stream. In this case, if the time stamp of the received data stream does not match the expected value, the wrong decryption scheme will be selected and the proper CW (to decrypt the program material) will not be produced. If, however, the time stamp of the received data stream matches the expected value, the proper decryption scheme will be selected, and the CWP decryption scheme will yield the proper CW.

Subscriber Reception and Decryption of Media Programs

Figure 4:
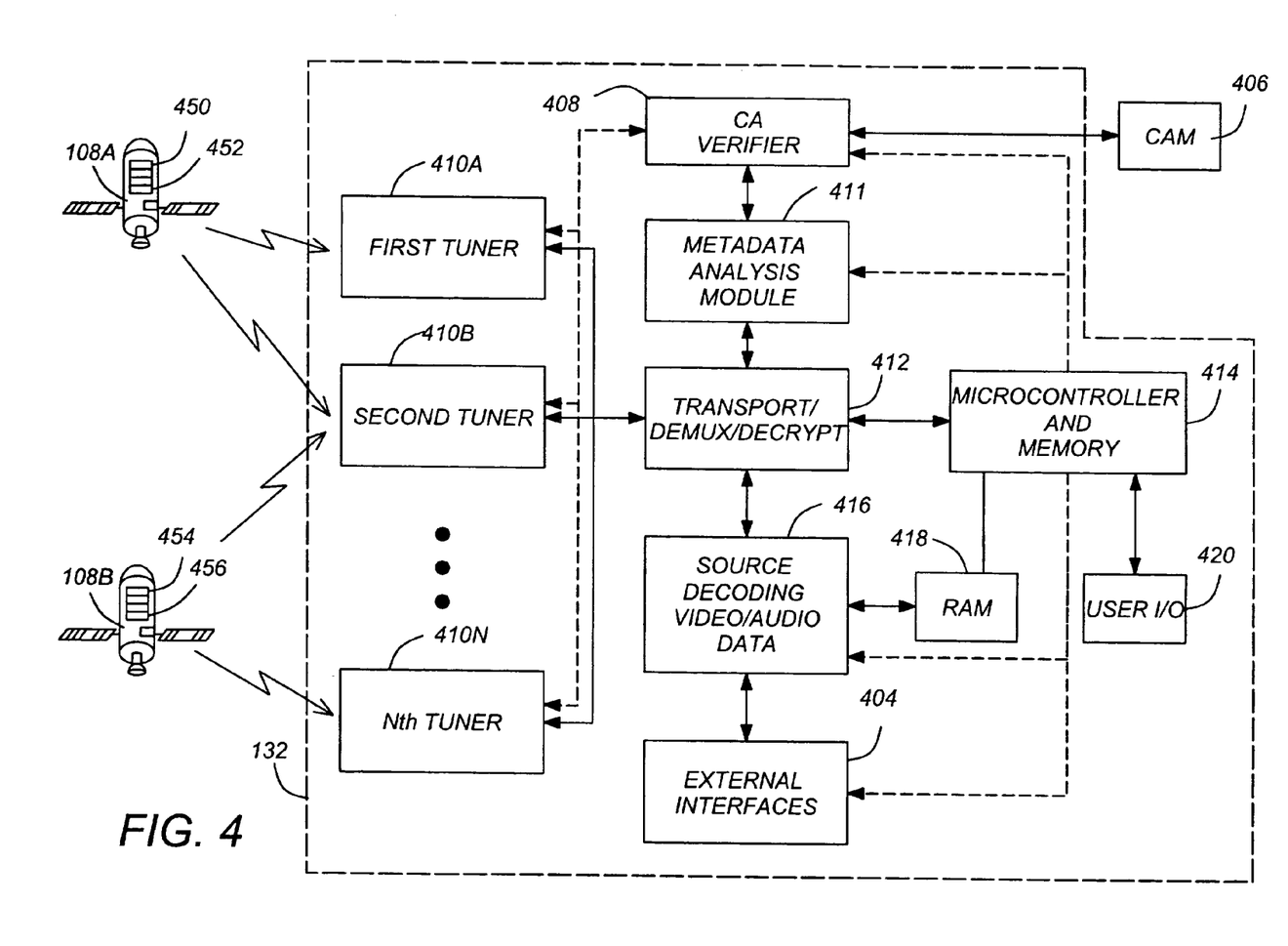
FIG. 4 is a block diagram illustrating a high-level block diagram of the IRD.

FIG. 4 is a simplified block diagram of an IRD 132. The IRD 132 receives and decrypts the media programs broadcast by the video distribution system 100. These media programs are streamed to the IRD 132 in real time, and may include, for example, video, audio, or data services.

The media programs may be transmitted by a plurality of satellites such as satellite 108A and 108B (hereinafter alternatively collectively referred to as satellite(s) 108), each of which typically includes a plurality of transponders 450–456.

The IRD 132 is communicatively coupleable to a conditional access module (CAM) 406. The CAM 406 is typically implemented in a smart card or similar device, which is provided to the subscriber 110 to be inserted into the IRD 132. The CAM 406 interfaces with a conditional access verifier (CAV) 408 (hereinafter alternatively referred to as the verifier) which performs at least some of the functions necessary to verify that the subscriber 110 is entitled to access the media programs. The CAV 408 is communicatively coupled to the tuner(s) 410 via other elements in the IRD 132, including the microcontroller and memory 414.

In the illustrated embodiment, the CAV 408 is also communicatively coupled to the tuners 410. This permits the CAV 408 to receive information from the tuners regarding which satellite/transponder/channel each tuner is tuned to and to supply commands to the tuners 410 to switch channels at appropriate times. In another embodiment, the CAV 408 is not directly coupled to the tuners, but receives information regarding the tuners 410 via the microprocessor and memory 414 (which controls the tuners and receives information from them) and provides commands to the tuners via the microprocessor and memory 414 as well.

The CAV 408 may be communicatively coupled to the CAM 406 via a metadata analysis module (MAM) 411. Using the information (which can be stored in metadata table, the MAM 411 acts as a gate-keeper to determine whether stored media programs will be decrypted and presented to the subscriber 110. This is accomplished by comparing the metadata values with measured or accumulated values. The CAV 408 and the MAM 411 can be implemented as separate modules from the transport/demux/decryptor 412 and the microcontroller and memory 414 as shown, or may be implemented via software instructions stored in the memory and performed by the microcontroller 414.

In one embodiment, the IRD 132 comprises a plurality of tuners such as first tuner 410A and second tuner 410B and N$^{th}$ tuner 410N (alternatively referred to hereinafter as tuner(s) 410), a transport and demultiplexing module (TDM) 412, which operates under control of a microcontroller and associated memory 414, a source decoder 416 and communicatively coupled random access memory (RAM) 418, and a user I/O device for accepting subscriber 110 commands and for providing output information to the subscriber.

Each of the tuners 410 receive the data packets from the video distribution system and provide the packets to the TDM 412. The use of multiple tuners 410 allows the IRD 132 to quickly tune a signal from one of a plurality of satellites without moving the antenna or the antenna reflector. The use of two tuners also allows the IRD 132 to receive media program information at a higher bandwidth by receiving information with both tuners simultaneously. This can be implemented by dedicating each tuner to a different low noise block converter (LNB) or an entirely different antenna than the other tuner 410.

Using the SCIDs associated with each media program, the TDM 412 reassembles the data packets according to the channel selected by the subscriber 110, and unencrypts the media programs using the CW key. The TDM 412 can be implemented by a single secure chip, and is communicatively coupled to a microcontroller and memory 414.

Once the media programs are unencrypted, they are provided to the source decoder 416 which decodes the media program data according to MPEG or JPEG standards as appropriate. The decoded media program is then provided to a D/A converter (if necessary) and provided to external interfaces 404 which can include a media program presentation device such as a television, an audio system, or a computer. The source decoder 416 makes use of communicatively coupled RAM 418 to perform these functions.

The CW key is obtained from the CWP using the CAV 408 and the CAM 406. The TDM 412 provides the CWP to the CAM 406 via the CAV 408. The CAM 406 uses the I/O indecipherable algorithm to generate the CW, which is provided back to the TDM 412. The TDM 412 uses the CW to decrypt the media programs. In most IRDs 132, the CAV 408 and the CAM 406 are capable of decrypting one video/audio/data media program at a time.

As described above, to discourage potential pirates, the control data in the CWP used to decode a particular media program may change with time so that it only produces the proper CW when applied to a media program having the proper time stamp. In this case, the CAM 406 can select and/or control the decryption scheme (e.g. the I/O indecipherable algorithm) according to the time stamp associated with the data stream carrying the media program. If the media program is sufficiently disassociated in time, the improper decryption scheme will be used, and the proper CW to decode the media program will not be produced.

Further details regarding the encryption and decryption of media programs can be found in co-pending and commonly assigned U.S. patent application Ser. No. 09/491,959, which application is hereby incorporated by reference herein.

Figure 5A:
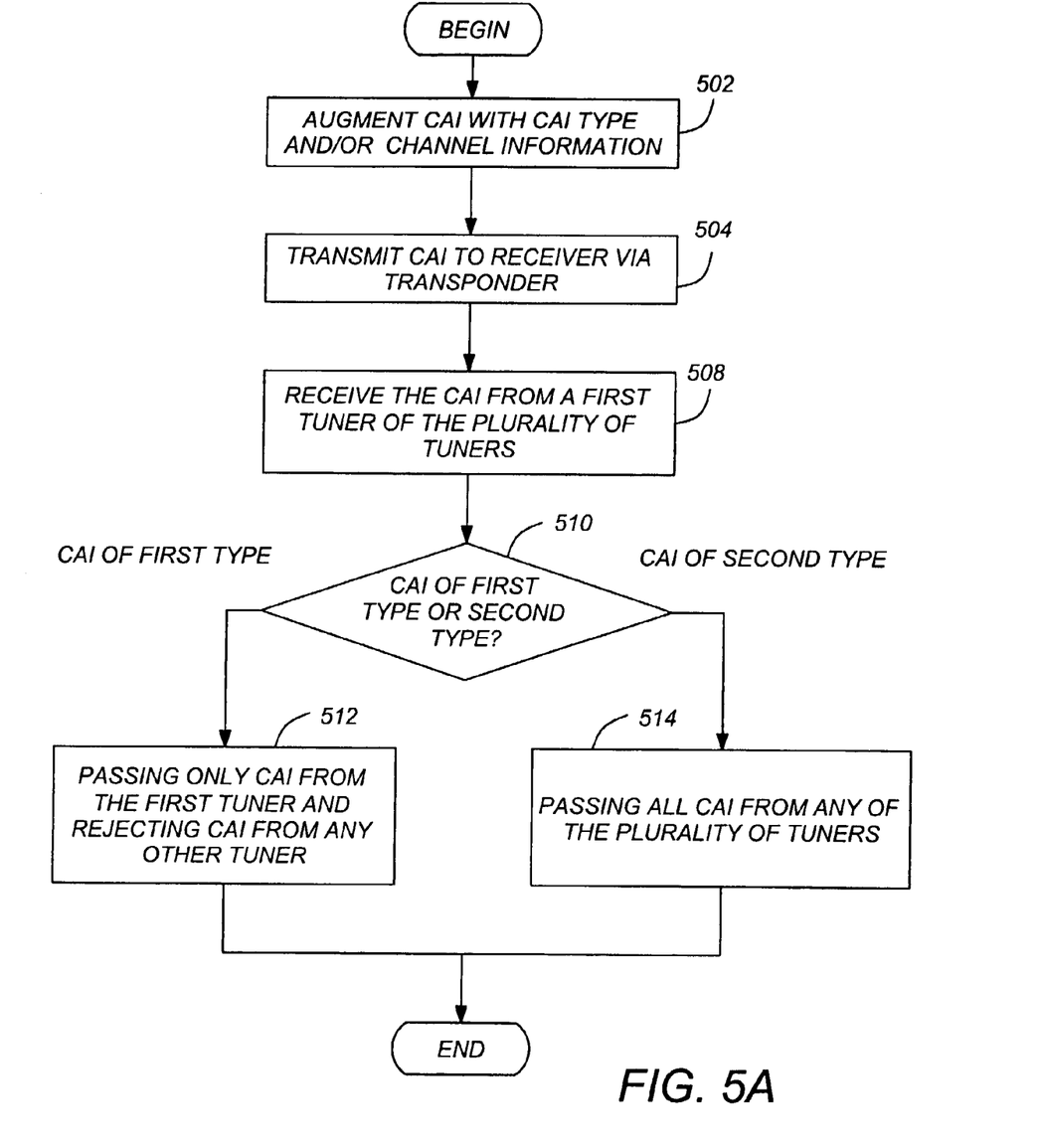
FIGS. 5A–5D are diagrams illustrating exemplary method steps that can be used to practice the present invention.

FIG. 5A is a flow chart illustrating exemplary method steps used to practice one embodiment of the present invention. In block 502, the CAI is augmented to include CAI information indicating whether the CAP to be transmitted is a type A CAP (which is transmitted via all transponders 450–456) or a type S CAP (which is transmitted by a subset of the transponders 450–456). This step can be performed by the conditional access manager 208, the associated packetizer 204E, or a combination of both.

Next, the CAI (contained in the CAPs) is transmitted to the IRD 132 via one or more of the transponders 450–456. If the CAI is type A, the CAI is transmitted by all transponders 450–456. However, if the CAI is identified as type B, the CAI can be transmitted only by a subset of transponders (e.g. transponder 456), and the CAI will still be routed to the CAM 406 as appropriate. These operations are typically performed by the uplink center 104, the uplink antenna 106, and the transponders (450–456) on satellites 108A and 108B.

The CAI is then received by a first tuner 410A of the plurality of tuners 410A–410N in the receiver 132. The CAI is then examined to determine whether the CAI is of a first type (type A) that is transmitted by all of the plurality of transponders 450–456, or a second type (type S) that is transmitted by a subset of the plurality of transponders 450–456. In one embodiment, this is performed by examining CAI type information in the header. This is illustrated in block 510.

If the CAI is of the first type (type A), the tuner 410 that received the CAI is designated to be the only tuner that will receive the type A CAI. The CAI received on this tuner (in the current example, the first tuner 410A) is passed to the CAM 406 (or elsewhere for decryption), and identical CAI information from any other tuner is rejected (e.g. not passed to the CAM 406). This is illustrated in block 512. In another embodiment of the invention, the CAV 408 determines if the CAPs are redundant, rejects redundant CAPs, and passes non-redundant CAPs.

Figure 5B:
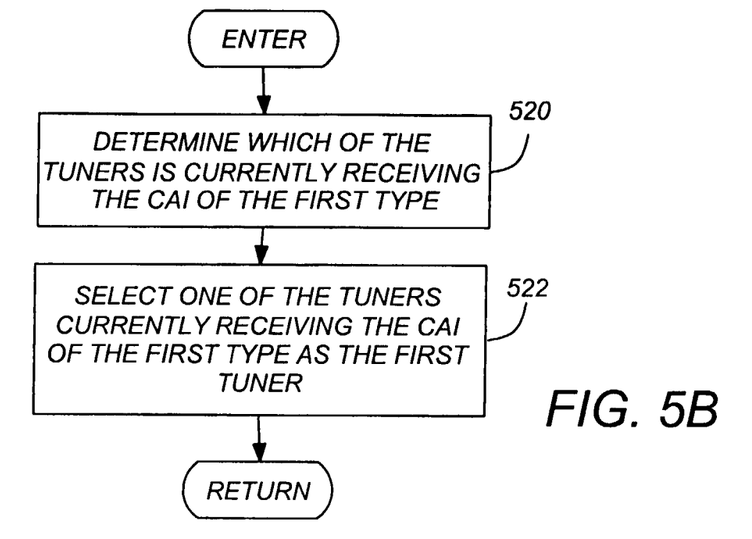

FIG. 5B is a flow chart depicting exemplary process steps that can be used to determine which tuner is designated to be the only tuner that will receive the type A CAI. As shown in blocks 520 and 522, a determination is made regarding which of the tuners 410 are receiving the type A CAI. That tuner 410 is then designated or selected as the tuner to receive type A CAI.

Figure 5C:
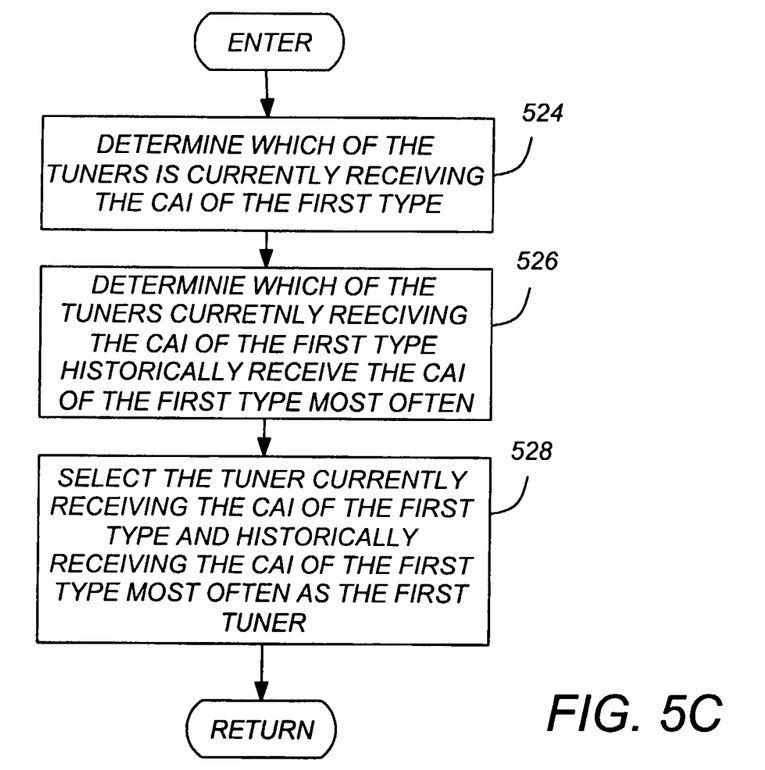

FIG. 5C is a flow chart depicting exemplary process steps depicting another technique that can be used to determine which tuner is designated to be the only tuner that will receive type A CAI. As shown in blocks 524–528, this is accomplished by selecting or designating the tuner that is both currently receiving type A CAI and also of such tuners (since there may be multiple tuners receiving a particular type A CAI), the tuner which historically receives type A CAI most often. To implement this technique, the verifier 408, microprocessor 414 or other element of the IRD 132 compiles the CAI statistics that allow the tuner that most often receives type A CAI to be identified.

Figure 5D:
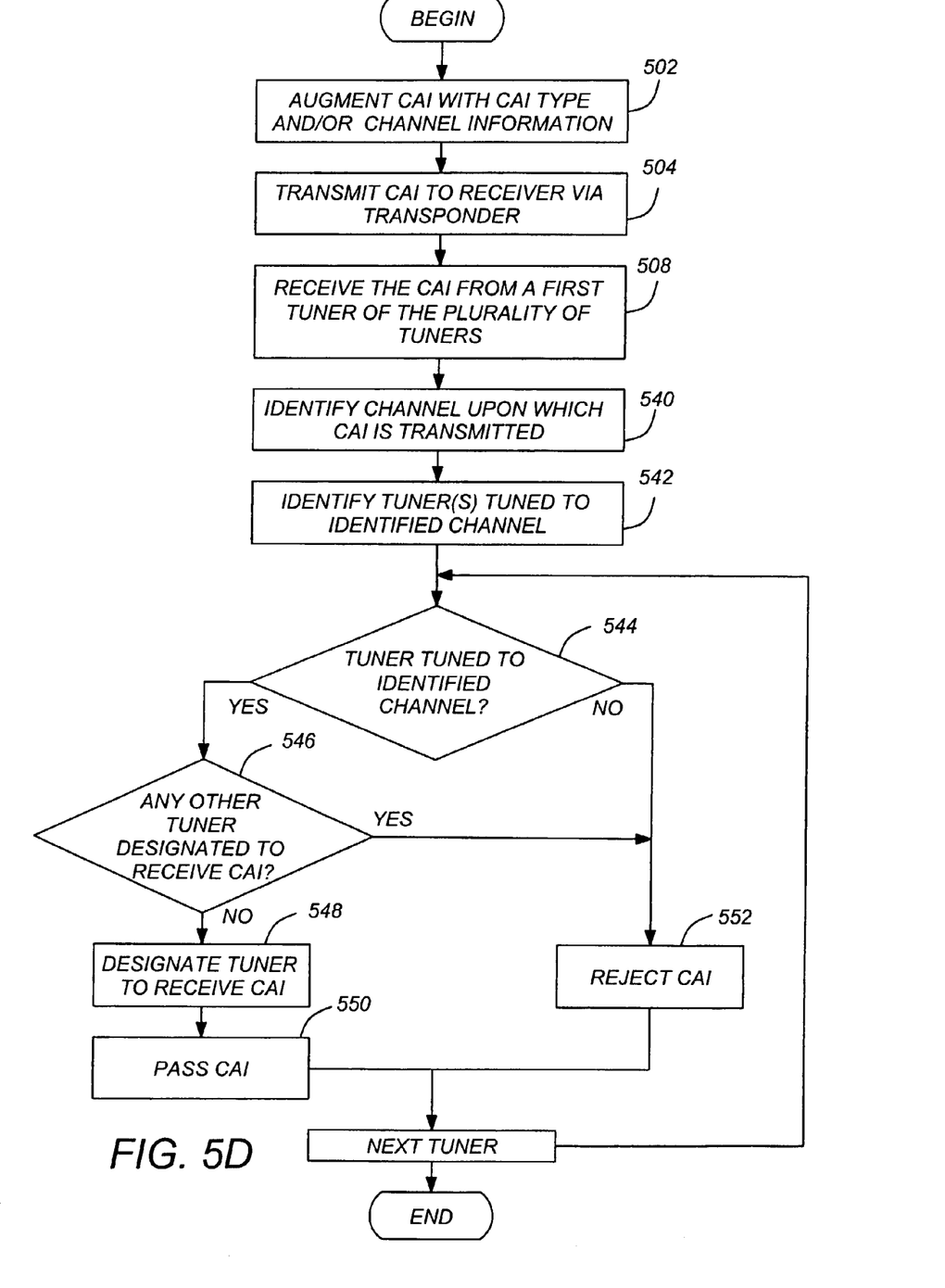

FIG. 5D is a flow chart depicting exemplary process steps used in another embodiment of the present invention. This embodiment permits CAPs associated with a particular channel to be sent only on the transponder carrying that channel. Steps 502–508 of this embodiment are analogous to those described above with respect to FIG. 5A. In this embodiment, however, the CAI includes channel information identifying the channel transmitting the CAI. As previously described, this information can be in the header of the CAP. Using this information, the channel upon which the CAI was transmitted is identified, as shown in block 540. Then, a determination is made regarding which of the tuners 410 are tuned to the channel identified in block 540.

If a particular tuner 410 is not tuned to the identified channel, then the CAI from that tuner 410 is rejected, as shown in blocks 544 and 552.

If the tuner 410 under examination is tuned to the identified channel and no other tuner has been designated to receive the CAI, the tuner 410 is designated as the tuner to receive the CAI (block 540), and the CAI is passed to the CAM 406 (block 550). If the tuner is tuned to the identified channel (block 544), but another tuner is already designated to receive the CAI (block 546), the CAI from the tuner 410 under examination is rejected, as shown in block 552.

In another embodiment of the invention, both the CAI data type information and the channel information are transmitted with the CAI, and both are used to determine which to pass to the CAM 406 and which to reject. For example, instead of passing all CAIs from any of the plurality of tuners if the CAI is of the second type (type S), the channel information can be examined to determine which of the tuners are tuned to the identified channel, and the only CAIs from tuners that are tuned to the identified channel are passed to the CAM 406.

The foregoing method steps can be implemented in a number of ways, including by use of software modules and hardware modules having a plurality interconnected circuit elements. In one embodiment of the present invention, the steps shown in FIGS. 5A–5D are performed at least in part in the CAV 408, by a hardware module and/or a software module. The processor for performing the operations defined in the software module may be stored in a CAV 408 dedicated memory coupled to a CAV 408 dedicated processor, or may be performed by the microcontroller and associated memory 414. Other elements, such as the CAM 406 and/or the microcontroller and memory 414 may perform some or all of the functions described in FIGS. 5A–5C.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. For example, the encryption functions described herein could be performed by separate encryption/decryption modules, or a single multi-purpose encryption/decryption module can be utilized to perform the encryption/decryption functions of many separate modules.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of processing conditional access information (CAI), receivable on a receiver having a plurality of tuners, comprising the steps of:
  receiving the CAI from a first tuner of the plurality of tuners;
  determining if the CAI is of a first type that is transmitted by all of a plurality of transponders or of a second type that is transmitted by fewer than all of the plurality of transponders;
  passing, to a conditional access module, only CAI from the first tuner and rejecting CAI from any other tuner if the CAI is of a type that is transmitted by all transponders; and
  passing, to the conditional access module, all CAI from any of the plurality of tuners if the CAI is of a type that is transmitted by fewer than all transponders.

2. The method of claim 1, further comprising the steps of:
  determining which tuners of the plurality of tuners is currently receiving the CAI of the first type;
  selecting one of the tuners currently receiving the CAI of the first type as the first tuner.

3. The method of claim 1, further comprising the steps of:
  determining which tuner of the plurality of tuners is currently receiving the CAI of the first type historically receives CAI of the first type the most often;
  selecting the tuner currently receiving the CAI of the first type and historically receiving the CAI of the first type most often as the first tuner.

4. The method of claim 1, wherein the CAI information comprises CAI type information, and step of determining if the CAI is of a first type that is transmitted by all of a plurality of transponders or of a second type that is transmitted by fewer than all of the plurality of transponders comprises the steps of:
  examining the CAI type information;
  determining if the CAI is of the first type or the second type from the CAI type information.

5. The method of claim 4, wherein the CAI forms at least a part of a data packet having a header, and the header includes the CAI type information.

6. The method of claim 5, wherein the transponders transmit the data packets on a plurality of channels, and at least a portion of the header of at least a portion of the data packets includes channel information identifying the channel on which the data packet is transmitted, and the method further comprises the steps of:
  identifying the channel transmitting the data packet from the channel information;
  determining if any of the plurality of tuners are tuned to the identified channel; and
  passing, to the conditional access module, the CAI of the data packet if any of the plurality of tuners are tuned to the identified channel.

7. The receiver of claim 1, wherein the module for determining if the CAI is of a first type that is transmitted by all of the plurality of transponders or of a second type that is transmitted by fewer than all of the plurality of transponders further determines which tuners of the plurality of tuners is currently receiving the CAI of the first type and selects one of the tuners currently receiving the CAI of the first type as the first tuner.

8. The receiver of claim 1, wherein the module further determines which tuner of the plurality of tuners is currently receiving the CAI of the first type historically receives CAI of the first type the most often and selects the tuner currently receiving the CAI of the first type and historically receiving the CAI of the first type most often as the first tuner.

9. The receiver of claim 1, wherein the CAI information comprises CAI type information, and module for determining if the CAI is of a first type that is transmitted by all of a plurality of transponders or of a second type that is transmitted by fewer than all of the plurality of transponders further examines the CAI type information and determines if the CAI is of the first type or the second type from the CAI type information.

10. The receiver of claim 9, wherein the CAI forms at least a part of a data packet having a header, and the header includes the CAI type information.

11. The receiver of claim 10, wherein the transponders transmit the data packets on a plurality of channels, and at least a portion of the header of at least a portion of the data packets includes channel information identifying the channel on which the data packet is transmitted, and the module further identifies the channel transmitting the data packet from the channel information, and passes, to the conditional access module, the CAI of the data packet if any of the plurality of tuners are tuned to the identified channel.

12. An apparatus for processing conditional access information (CAI), receivable on a receiver having a plurality of tuners, comprising:
  means for receiving the CAI from a first tuner of the plurality of tuners;
  means for determining if the CAI is of a first type that is transmitted by all of a plurality of transponders or of a second type that is transmitted by fewer than all of the plurality of transponders;
  means for passing, to a conditional access module, only CAI from the first tuner and rejecting CAI from any other tuner if the CAI is of a type that is transmitted by all transponders; and
  means for passing, to the conditional access module, all CAI from any of the plurality of tuners if the CAI is of a type that is transmitted by fewer than all transponders.

13. The apparatus of claim 12, further comprising:
  means for determining which tuners of the plurality of tuners is currently receiving the CAI of the first type;
  means for selecting one of the tuners currently receiving the CAI of the first type as the first tuner.

14. The apparatus of claim 12, further comprising:
  means for determining which tuner of the plurality of tuners is currently receiving the CAI of the first type historically receives CAI of the first type the most often; and
  means for selecting the tuner currently receiving the CAI of the first type and historically receiving the CAI of the first type most often as the first tuner.

15. The apparatus of claim 12, wherein the CAI information comprises CAI type information, and means for determining if the CAI is of a first type that is transmitted by all of a plurality of transponders or of a second type that is transmitted by fewer than all of the plurality of transponders comprises:
  examining the CAI type information; and
  determining if the CAI is of the first type or the second type from the CAI type information.

16. The apparatus of claim 15, wherein the CAI forms at least a part of a data packet having a header, and the header includes the CAI type information.

17. The apparatus of claim 6, wherein the transponders transmit the data packets on a plurality of channels, and at least a portion of the header of at least a portion of the data packets includes channel information identifying the channel on which the data packet is transmitted, the apparatus further comprising:
  means for identifying the channel transmitting the data packet from the channel information; and
  means for passing, to the conditional access module, the CAI of the data packet if any of the plurality of tuners are tuned to the identified channel.

18. A receiver for processing conditional access information (CAI), receivable on a receiver having a plurality of tuners, comprising:
  a plurality of tuners for receiving the CAI; and
  a verifier, communicatively coupled to the plurality of tuners, the verifier for receiving the CAI from a first tuner of the plurality of tuners and comprising a module for determining if the CAI is of a first type that is transmitted by all of a plurality of transponders or of a second type that is transmitted by fewer than all of the plurality of transponders; for passing, to a conditional access module, only CAI from the first tuner and rejecting CAI from any other tuner if the CAI is of a type that is transmitted by all transponders; and for passing, to the conditional access module, all CAI from any of the plurality of tuners if the CAI is of a type that is transmitted by fewer than all transponders.

19. A method of transmitting conditional access information (CAI), the CAI usable to decrypt media programs and the CAI receivable on a receiver having a plurality of tuners, comprising the steps of:
  augmenting the CAI with CAI type information describing whether the CAI is of a first type that is transmitted by all of a plurality of transponders or of a second type that is transmitted by fewer than all of the plurality of transponders; and transmitting the augmented CAI to the receiver via one of the plurality of transponders.

20. An apparatus for transmitting conditional access information (CAI), the CAI usable to decrypt media programs and the CAI receivable on a receiver having a plurality of tuners, comprising:

a processor for augmenting the CAI with CAI type information describing whether the CAI is one of a first type that is transmitted by all of a plurality of transponders or of a second type that is transmitted by fewer than all of the plurality of transponders; and a transmitter for transmitting the augmented CAI to the receiver via one of the plurality of transponders.

21. A system for transmitting conditional access information (CAI), the CAI usable to decrypt media programs and receivable on a receiver having a plurality of tuners, comprising:

a processor for augmenting the CAI with CAI type information describing whether the CAI is one of a first type that is transmitted by all of a plurality of transmitted by all of a plurality of transponders or of a second type that is transmitted by fewer than all of the plurality of transponders;

a transmitter for transmitting the augmented CAI to the receiver via one of the plurality of transponders;

a receiver, for receiving the augmented CAI on a first tuner; and a verifier, communicatively coupled to the plurality of tuners, the verifier for receiving the CAI from a first tuner of the plurality of tuners and comprising a module for evaluating the CAI type information to determine if the CAI is of a first type that is transmitted by all of a plurality of transponders or of a second type that is transmitted by fewer than all of the plurality of transponders; for passing, to a conditional access module, only CAI from the first tuner and rejecting CAI from any other of the plurality of tuners if the CAI is of a type that is transmitted by all transponders; and for passing, to the conditional access module, all CAI from any of the plurality of tuners if the CAI is of a type that is transmitted by fewer than all transponders.

22. A method of processing conditional access information (CAI) transmittable on one or more of a plurality of channels, receivable on a receiver having a plurality of tuners, the CAI having channel information identifying the channel on which the CAI is transmitted, the method comprising the steps of:

identifying the channel transmitting the CAI from the channel information;

determining if any of the plurality of tuners are tuned to the identified channel; and passing, the CAI to the conditional access module, only if at least one of the plurality of tuners are tuned to the identified channel.

23. The method of claim 22, further comprising the steps of:

identifying a tuner tuned to the identified channel as a tuner designated to receive the CAI; and rejecting the CAI if another tuner of the plurality of tuners is designated to receive the CAI.

* * * * *